(12) United States Patent
     Chen

(10) Patent No.: US 10,992,248 B2
(45) Date of Patent: Apr. 27, 2021

(54) MOTOR DEVICE

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 134 days.

(21) Appl. No.: 16/293,742

(22) Filed: Mar. 6, 2019

(65) Prior Publication Data

US 2020/0136546 A1   Apr. 30, 2020

(30) Foreign Application Priority Data

Oct. 26, 2018 (TW) .................................. 107138082

(51) Int. Cl.
*H02P 25/22* (2006.01)
*H02P 25/20* (2006.01)

(52) U.S. Cl.
CPC ............. *H02P 25/20* (2013.01); *H02P 25/22* (2013.01)

(58) Field of Classification Search
CPC ........ H02P 25/22; H02P 25/184; H02P 25/20; H02P 25/18
See application file for complete search history.

(56) References Cited

U.S. PATENT DOCUMENTS

| | | | | |
|---|---|---|---|---|
| 3,161,814 A * | 12/1964 | Calland | ................ | H02K 41/025 318/773 |
| 4,417,192 A * | 11/1983 | Ghosh | ....................... | H02P 1/26 318/797 |
| 4,635,349 A * | 1/1987 | Rabe | ...................... | H02K 17/06 29/596 |
| 5,352,964 A * | 10/1994 | Nakamura | .............. | H02P 25/18 318/772 |
| 5,451,854 A * | 9/1995 | Uuskoski | ................. | B66B 1/28 310/198 |
| 6,946,768 B2 * | 9/2005 | Kruse | ....................... | H02K 3/28 310/179 |
| 8,936,211 B2 * | 1/2015 | Yamaguchi | ............. | H01F 41/06 242/434 |
| 10,411,530 B2 * | 9/2019 | Toi | ........................... | H02K 3/28 |
| 2014/0042862 A1 * | 2/2014 | Ishigami | .................. | H02K 3/12 310/187 |
| 2017/0093238 A1 * | 3/2017 | Toi | ........................... | H02K 3/28 |

* cited by examiner

*Primary Examiner* — Thai T Dinh
(74) *Attorney, Agent, or Firm* — Burris Law, PLLC

(57) ABSTRACT

A motor device includes a stator unit including a plurality of first slots, a rotor unit rotatable relative to the stator unit, a winding unit, and a transfer switch unit. The winding unit includes first and second windings installed in the first slots. Number of poles of the first winding is less than that of the second winding. The transfer switch unit is electrically connected to the first and second windings, and is controlled to allocate access to electricity to each of the first and second windings.

14 Claims, 22 Drawing Sheets

MOTOR DEVICE

CROSS-REFERENCE TO RELATED APPLICATION

This application claims priority of Taiwanese Patent Application No. 107138082, filed on Oct. 26, 2018.

FIELD

The disclosure relates to a motor device, and more particularly to an induction motor device.

BACKGROUND

A conventional motor device includes a rotor unit, a stator unit, three winding units installed in the stator unit, and a control unit. The control unit is adapted to control a power source to be electrically connected to the winding units, which in turn drive the rotor unit to rotate relative to the stator unit, producing torque.

The motor device, commonly used in appliances such as vehicles and air conditioners, usually acts against a relatively high mechanical load when starting, and against a relatively low mechanical load when the motor device has already started up. As such, the motor device is usually designed to operate at a high power output and a high rotational speed to ensure that the motor device can be initiate properly. Even though the motor device only requires reduced power output to operate after the initiation, the motor device tends to remain operating at the high power output and the high rotational speed. In other words, the extra output power generated has simply become wasted.

In order to resolve issues with overdrawing extraneous amount of power output, the motor device may be integrated with a variable frequency drive (VFD), which alters the output power and the rotational speed by varying motor input frequency and voltage from the power source to the winding units. However, the VFD is not economical, as an electric configuration thereof is relatively complex to design and manufacture.

SUMMARY

Therefore, an object of the disclosure is to provide a motor device that can alleviate the drawback of the prior art.

According to the disclosure, the motor device includes a rotor unit, a stator unit, at least one winding unit, and a transfer switch unit. The rotor unit is rotatable relative to the stator unit. The at least one winding unit includes first and second windings that are installed in the stator unit. Number of poles of the first winding is less than that of the second winding. The transfer switch unit is connected to the first and second windings, and is controlled to allocate access to electricity to each of the first and second windings.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
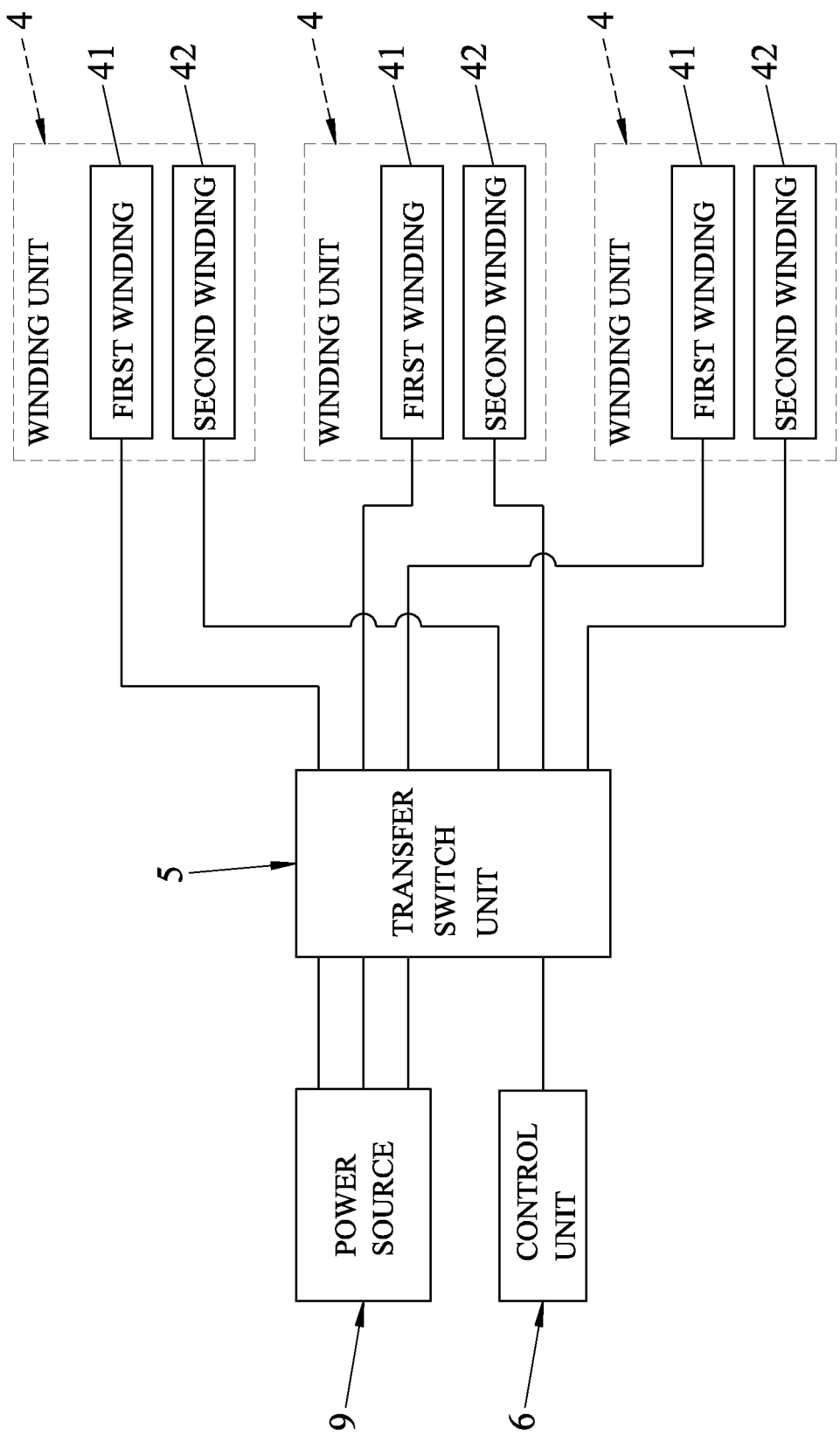
FIG. 1 is a block diagram illustrating a first embodiment of a motor device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
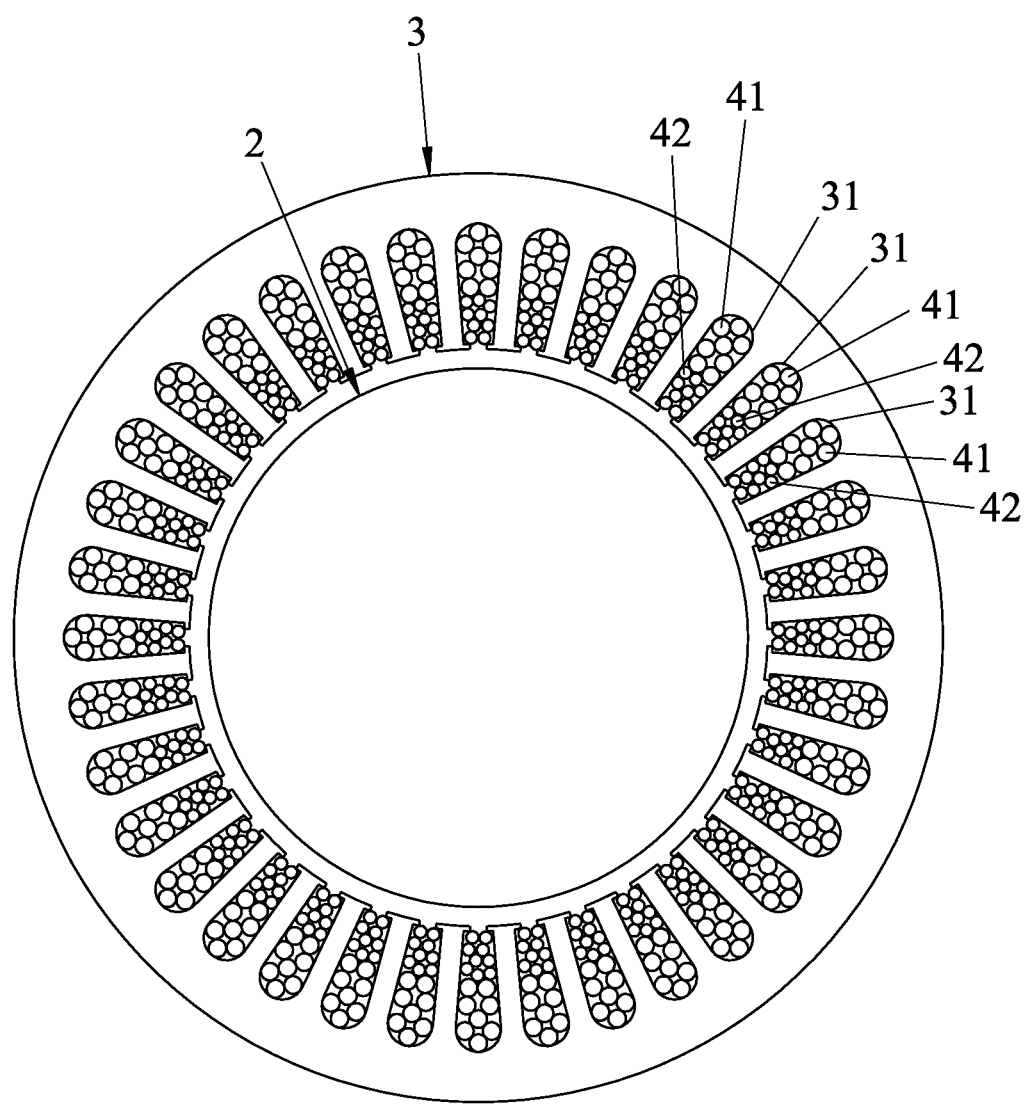
FIG. 2 is a schematic view of the first embodiment, illustrating alignment of first and seconding windings of winding units in a stator unit of the motor device.

Referring to FIGS. 1 and 2, a first embodiment of a motor device according to the disclosure is a three-phase AC motor device adapted to be electronically connected to a three-phase electric power source 9, and includes a rotor unit 2, a stator unit 3, three winding units 4, a transfer switch unit 5, and a control unit 6.

The rotor unit 2 is rotatable about an axle line thereof relative to the stator unit 3. The stator unit 3 surrounds the rotor unit 2, and includes a plurality of angularly spaced-apart first slots 31. In the first embodiment, number of the first slots 31 is thirty-six, but it may be different in other embodiments.

Each of the winding units 4 has first and second windings 41, 42 that are installed in the first slots 31 of the stator unit 3. The first and second windings 41, 42 are different in the following ways: number of poles of the first winding 41 is less than that of the second winding 42; output power of the first winding 41 is the rated power of the motor device, and it is greater than the output power of the seconding winding 42; a wire diameter of the first winding 41 is greater than that of the second winding 2; a pole distance of the first winding 41 is larger than that of the second winding 42. Specifically, the first winding 41 has a plurality of interconnected first coils each of which has two first coil sides (portions of each first coil that are installed in the first slots 31), and the second winding 42 has a plurality of interconnected second coils each of which has two second coil sides (portions of each second coil that are installed in the first slots 31). Each of the second coil sides of the second winding 42 is closer to the rotor unit 2 than each of the first coil sides of the first winding 41 to the rotor unit 2. It should be noted that, a plurality of windings are shown in various figures (FIGS. 2, 8, 11, 13, 15, 18, 21) to illustrate winding pattern of the windings in the stator unit 3, and are not meant to indicate the actual number of turns required. In addition, the windings may be evenly distributed among the first slots 31 of the stator unit 3.

In some embodiments, the first and second windings 41, 42 are configured as distributed windings, in which each of the first and second coil sides are distributed a plurality of the first slots 31. However, for the clarity of the illustration, in FIGS. 6, 7 and 9, each of the first and second coil sides is shown to be installed in only one first slot 31.

Figure 3:
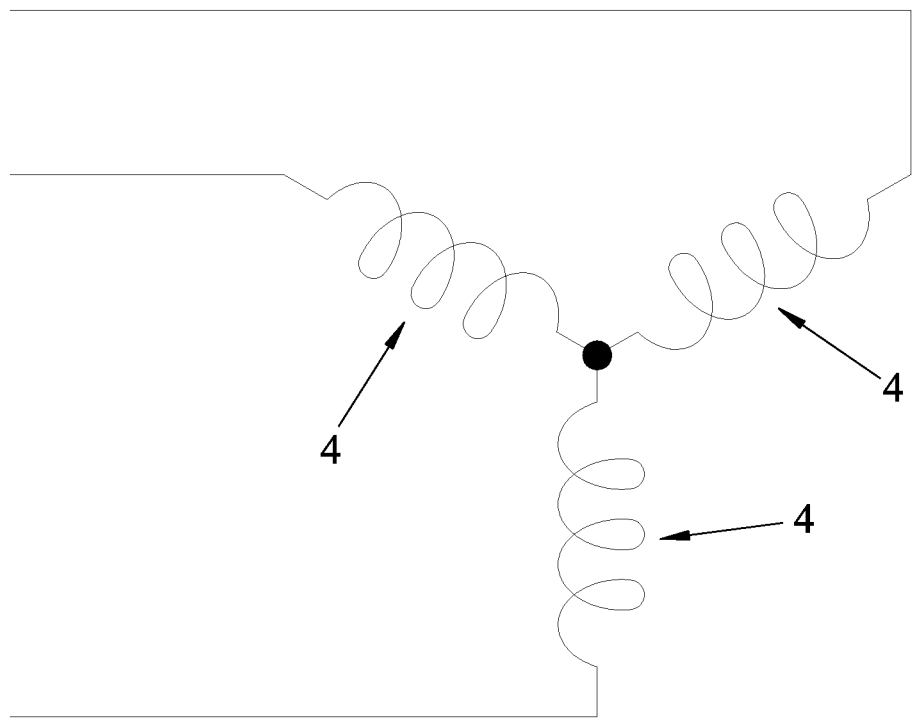
FIG. 3 is a circuit diagram of the winding units of the motor device in a wye connection.
Figure 4:
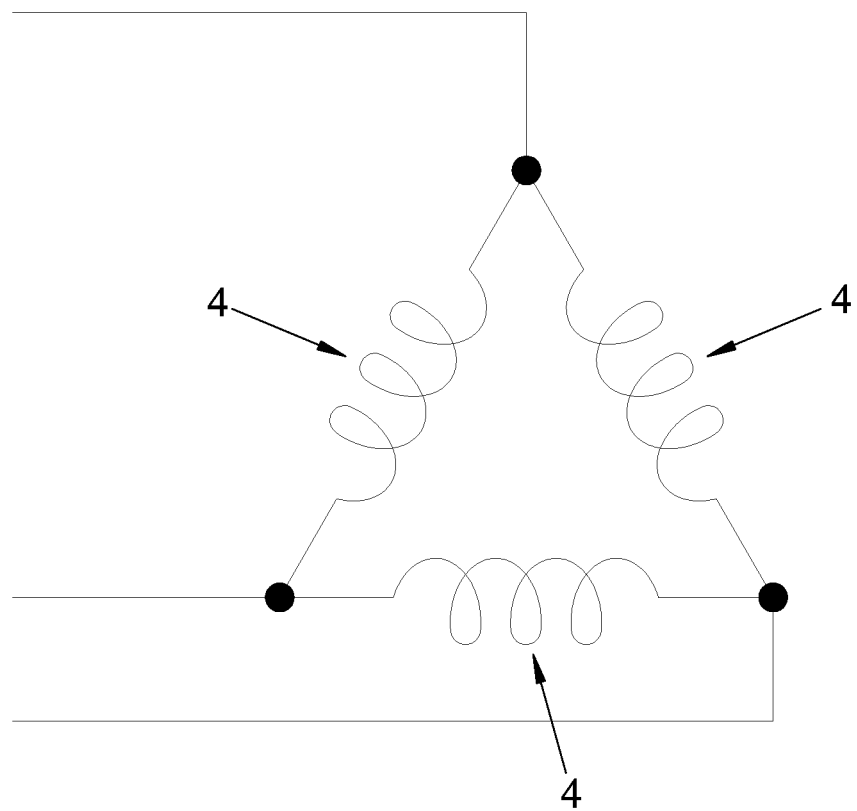
FIG. 4 is a circuit diagram of the winding units in a delta connection.

Referring to FIGS. 1, 3 and 4, as a three-phase AC motor, the winding units 4 of the motor device are configured in one of a wye connection (see FIG. 3) and a delta connection (see FIG. 4). These connections are basic three-phase configurations for an AC motor device and are well-known in the field.

Referring back to FIGS. 1 and 2, the transfer switch unit 5 is electrically connected to the control unit the first windings 41 and the second windings 42 of each of the winding units 4, and is adapted to be electrically connected to the power source 9.

The control unit 6 controls the transfer switch unit 5 to select either one of the first windings 41 and second windings 42 of each of the winding units 4 to be electrically connected to the power source 9. In other words, the control unit 6 toggles the motor device to deliver a first output magnitude when the first windings 41 are selected, and a second output magnitude, which delivers lower output power and lower rotational speed in comparison to the first output magnitude, when the second windings 42 are selected.

Figure 5:
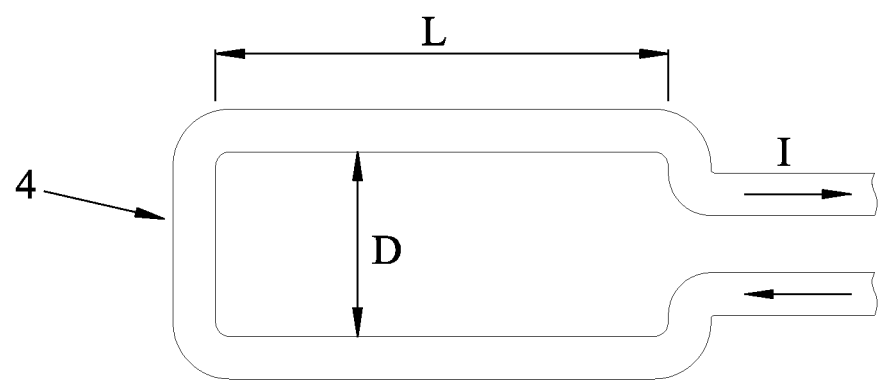
FIG. 5 is a fragmentary structural view of a coil of one of the winding units.

Referring further to FIG. 5, in principle, power output of the motor device is usually expressed in terms of horsepower (hp), and is the product of torque and rotational speed. An expression of the torque is summarized below:

$$T = \frac{\pi}{2} B * I * L * D^2 * N * \sin(\theta) \quad \text{(Eq. 1)}$$

in which T represents the torque, B represents magnetic field, I represents current, L represents length of each coil D represents width of each coil, N represents the number of turns of each coil, and $\theta$ represents the angle between the magnetic field and the current. Magnitude of the current (I) is directly proportional to the square of the wire diameter of each coil, and is related to the number of turns (N) of each coil. Based off Eq. 1, it can be inferred that, for the same motor device, some parameters (L, D, $\theta$) remain the same, and Eq. 1 can be simplified as below:

$$T \propto B * I * N \quad \text{(Eq. 2)}$$

An expression of the synchronous speed is expressed below, in which $n_s$ represents the synchronous speed, f represents frequency of the power source 9, and P represents the number of poles:

$$n_s = 120 f/P \quad \text{(Eq. 3).}$$

Lastly, an expression of the pole distance is expressed as the following:

$$\text{Pole distance} = \text{number of slots}/P \quad \text{(Eq. 4).}$$

Figure 6:
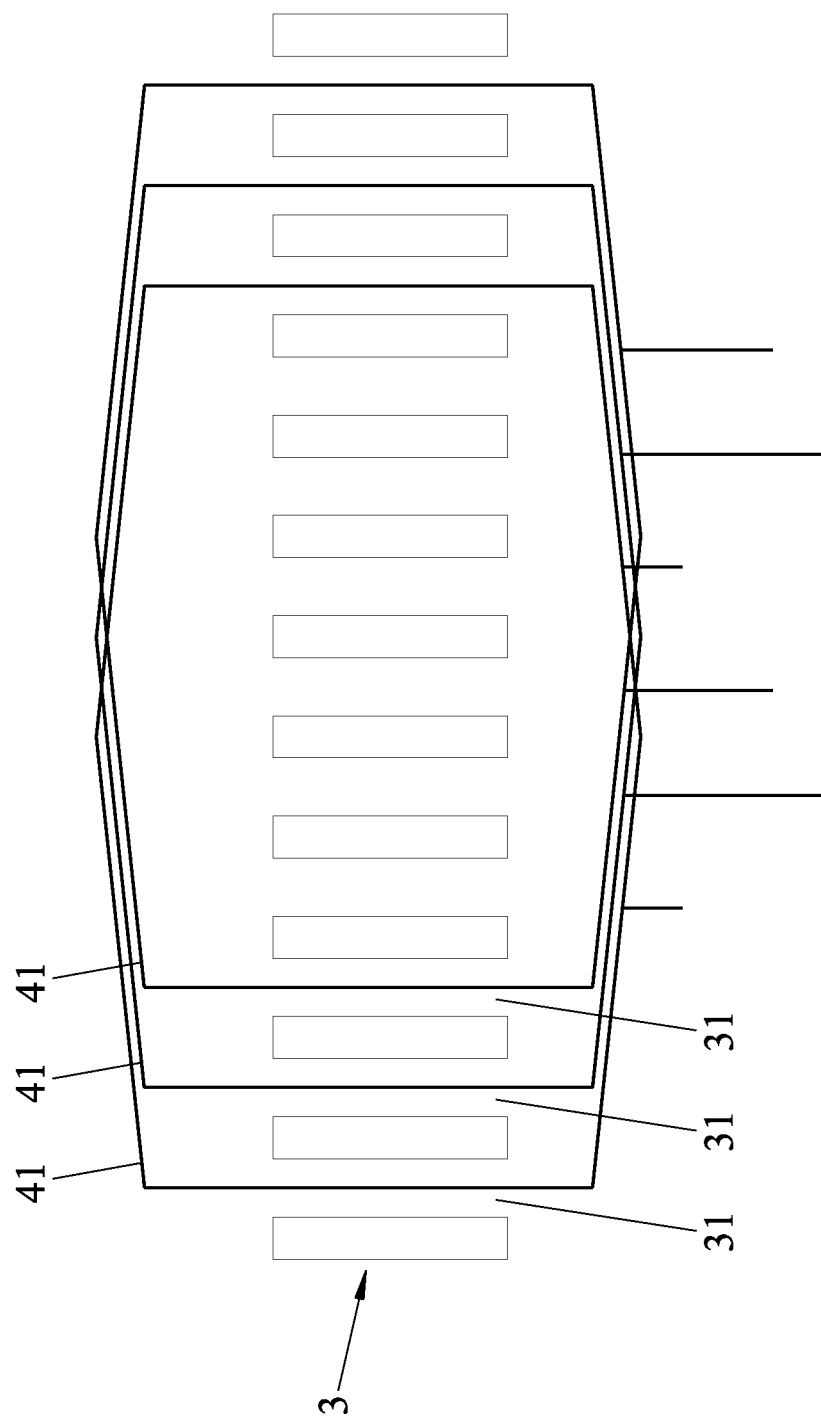
FIG. 6 is a schematic view of the first embodiment, illustrating winding pattern of the first windings in the stator unit.
Figure 7:
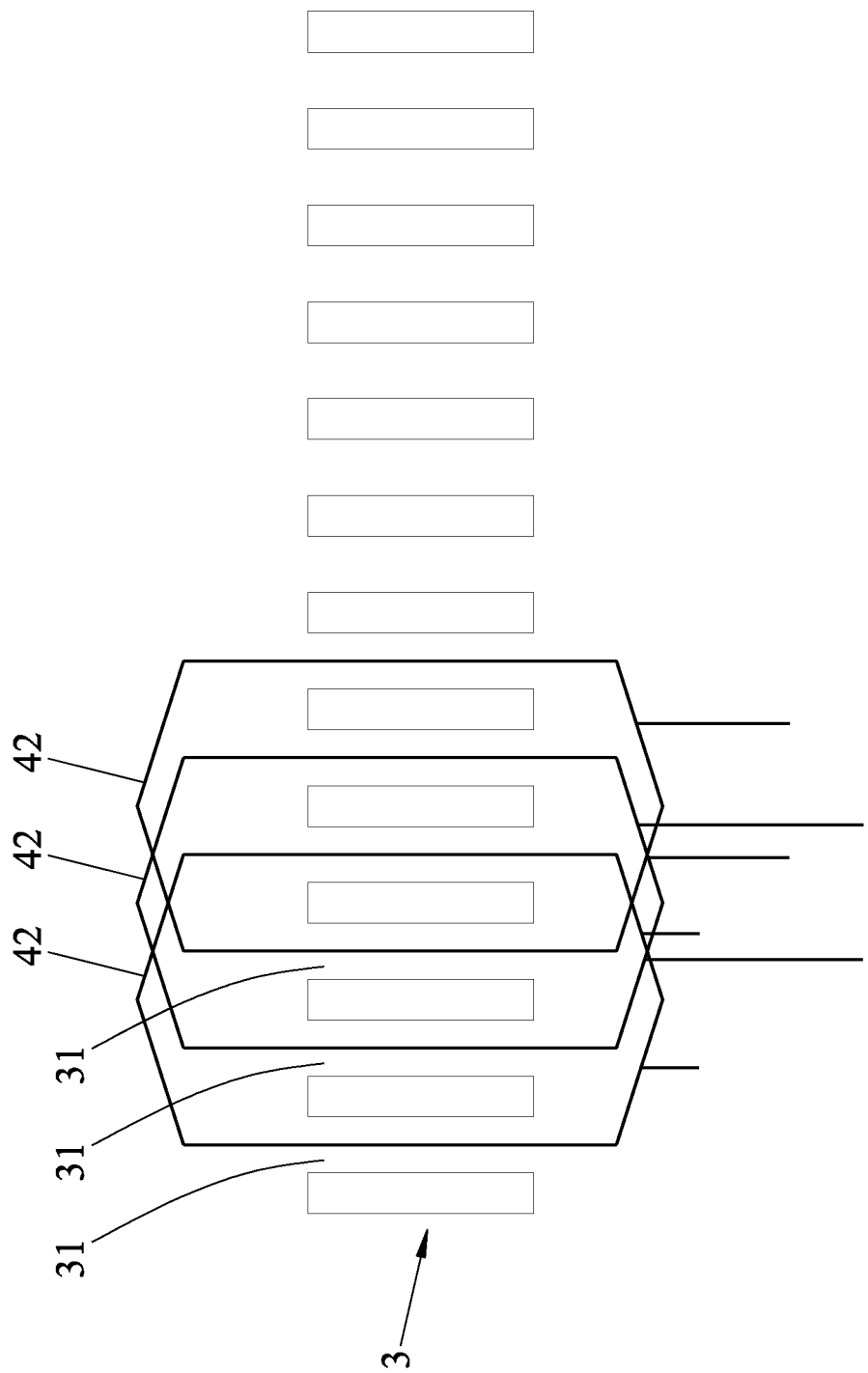
FIG. 7 is a schematic view of the first embodiment, illustrating winding pattern of the second windings in the stator unit.
Figure 8:
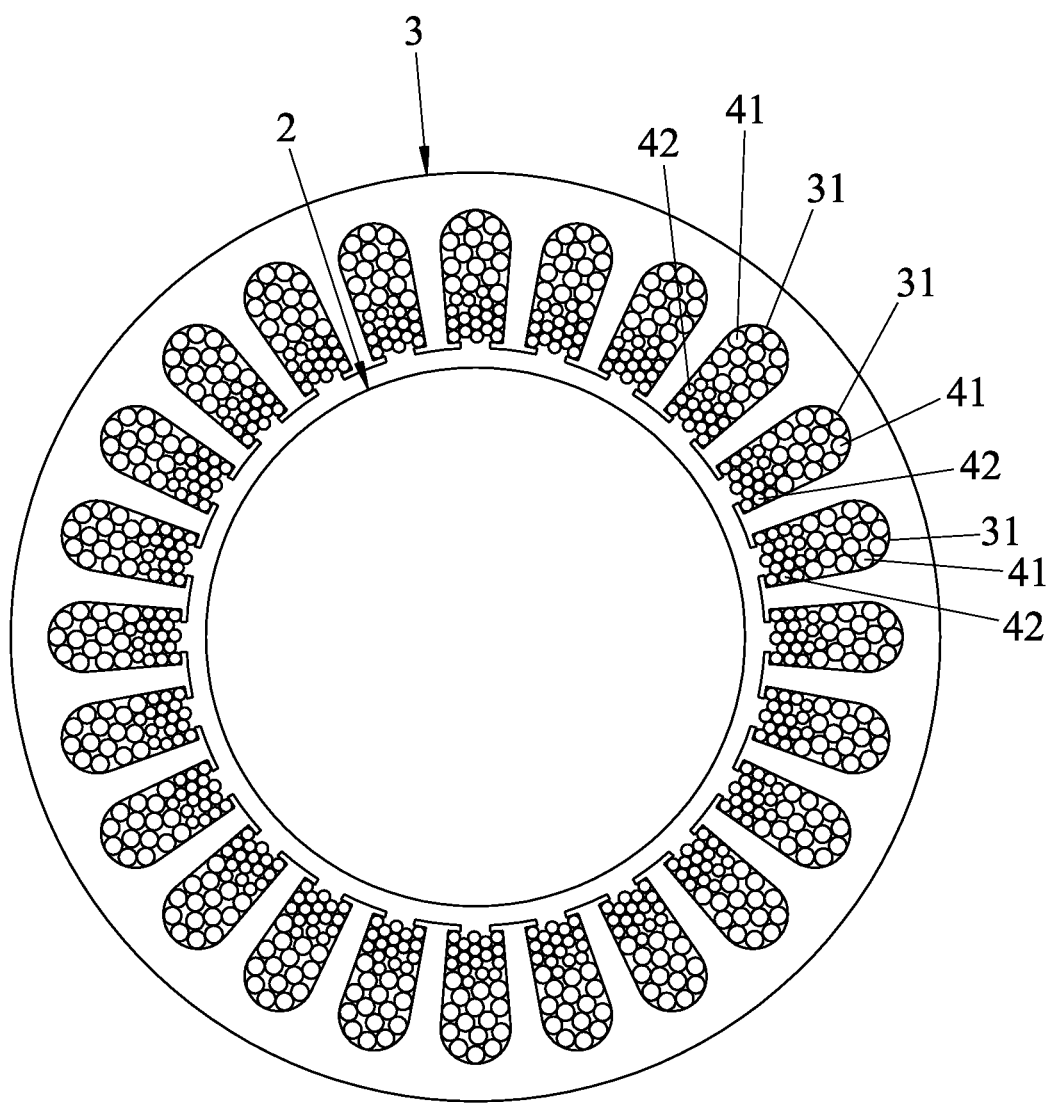
FIG. 8 is a view similar to FIG. 2, illustrating a modification of the stator unit.
Figure 9:
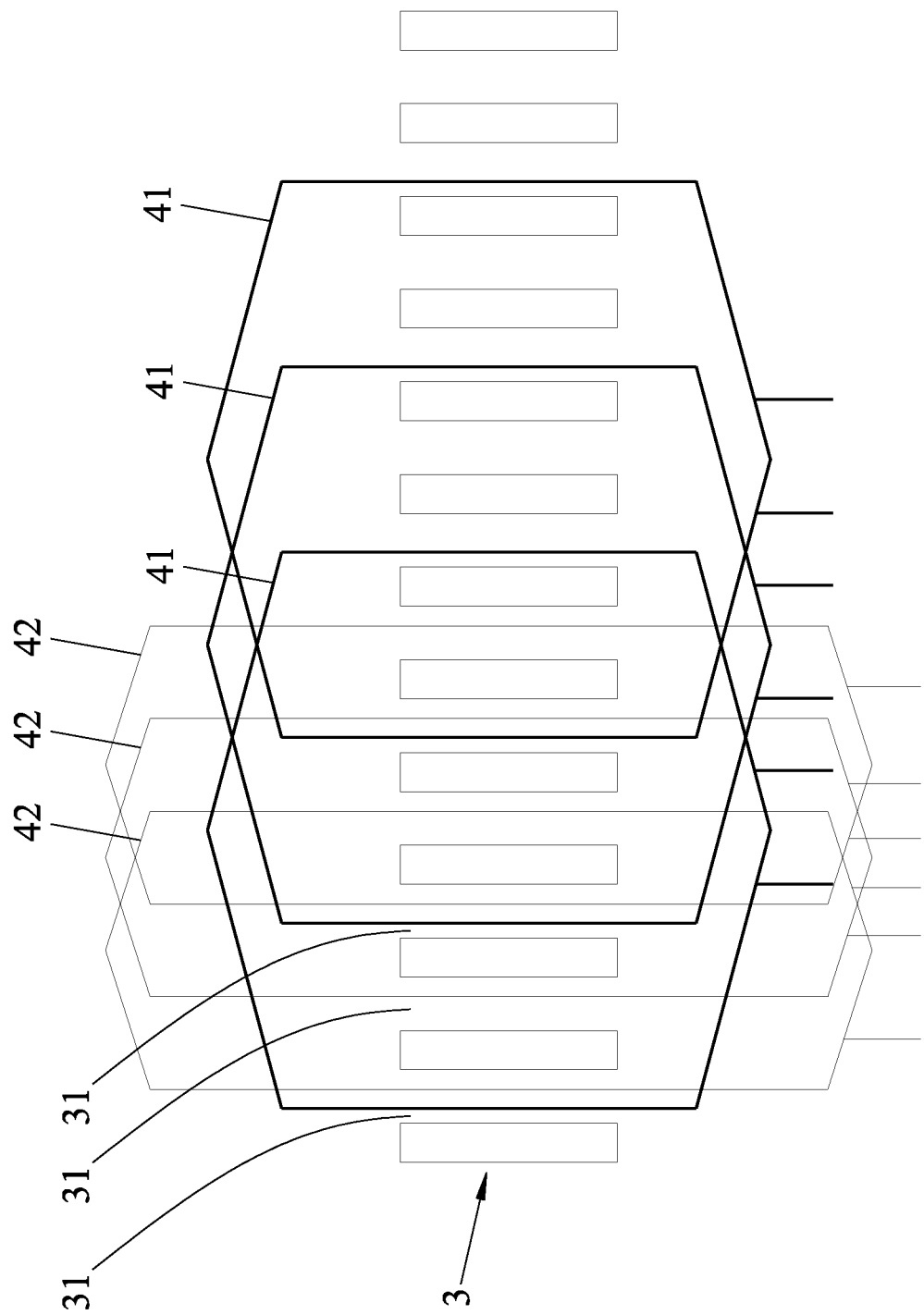
FIG. 9 is a schematic view of the first embodiment, illustrating a modification of the winding patterns of the first and second windings in the stator unit.

Referring to FIGS. 2, 6 and 7, each of the first windings 41 has four poles, and each of the second windings 42 has twelve poles. As such, referring to Eq. 3 and Eq. 4, each of the first windings 41 has a pole distance of nine (see FIG. 6) and a synchronous speed of 1800 revolutions per minutes (rpm) (assuming the frequency of the power source 9 is 60 Hz), and each of the second windings 42 has a pole distance of three (see. FIG. 7) and 600 rpm. In this embodiment, for each of the first and second windings 41, 42, distance between adjacent windings of the same type, is one slot apart. However, in other embodiments, the distance between adjacent windings of the same type is not restricted as such, and may be evenly spaced apart across the first slots 31 of the stator unit 3. Furthermore, for the clarity of the illustration, only one of the first coils or one of the second coils of each of the first and second windings 41, 42 of the winding units 4, and only a portion of the first slots 31 are shown in FIGS. 6, 7, and 9.

In addition, the number of first slots 31 of the stator unit 3, the number of poles of each of the first windings 41 and each of the second windings 42 may be different in other modification. For example, referring to FIGS. 8 and 9, in this modification of the first embodiment, the stator unit 3 has twenty-four first slots each of the first windings 41 has four poles, and each of the second windings 42 has eight poles. As such, referring to Eq. 3 and Eq. 4, each of the first windings has a pole distance of six (see FIG. 9) and a synchronous speed of 1800 rpm, and each of the second windings has a pole distance of three (see. FIG. 9) and 900 rpm. In this modification, distance between adjacent first windings 41 is two slots apart, and distance between adjacent second windings 42 is one slot apart, but is not restricted as such.

Referring back to FIGS. 1 and 2, in this embodiment, the output power of each of the first windings 41 and the output power of each of the second windings 42 are respectively two hp and one-fourth hp. The number of turns of each of the first and second coils of the first and second windings 41, 42 can be deducted through Eq. 1, and will not be discussed further in this specification.

During implementation, the motor device may deliver one of the first output magnitude and the second output magnitude. When the motor device is starting up or when the first output magnitude is required, the control unit 6 is operable to control the transfer switch unit 3 to select the first windings 41 to be electrically connected to the power source 9. In this embodiment, as the first windings 41 have four poles and two hp, the motor device has a synchronous speed of 1800 rpm and an output power of two hp. When the motor device has started up or when the second output magnitude is required, the control unit 6 is operable to control the transfer switch unit 5 to select the second windings 42 to be electrically connected to the power source 9. In this embodiment, as the second windings 42 have twelve poles and one-fourth hp, the motor device has a synchronous speed of 600 rpm and an output power of one-fourth hp.

In addition, the control unit 6 is operable to toggle the transfer switch unit 5 back and forth, easily switching between the abovementioned output magnitudes to satisfy different loads based off observed temperature and/or pressure differences. For example, when the motor device is used as part of the air conditioning device, the motor device is operable to deliver the first output magnitude when large margin of temperature difference is observed, and deliver the second output magnitude when temperature difference becomes smaller, conserving overall energy use.

Overall, the motor device of the disclosure has the following benefits:

1) Depending on usage demand, the transfer switch unit 5 can be controlled to allocate access to electricity to each of the first and second windings 41, 42, effectively selecting one of the first and second windings 41, 42 to be connected to the power source for delivering different magnitudes of rotational speed without relying on uneconomical VFD.

2) In addition to the different magnitude rotational speed offered by different windings, different magnitudes of output power can be supplied by different windings via determination of various parameters of the first and second windings 41, 42. As such, a suitable one of the first and second windings 41, 42 may be selected to save energy. In addition, by switching into second output magnitude after the motor device has started, the motor device is less likely to wear out due to running consistently at high load.

3) By having each of the second coil sides of the second winding 42 closer to the rotor unit 2 than each of the first coil sides of the first winding 41 to the rotor unit 2, the second winding 42, despite having smaller wire diameter and current, can still support formation of the magnetic field.

Figure 10:
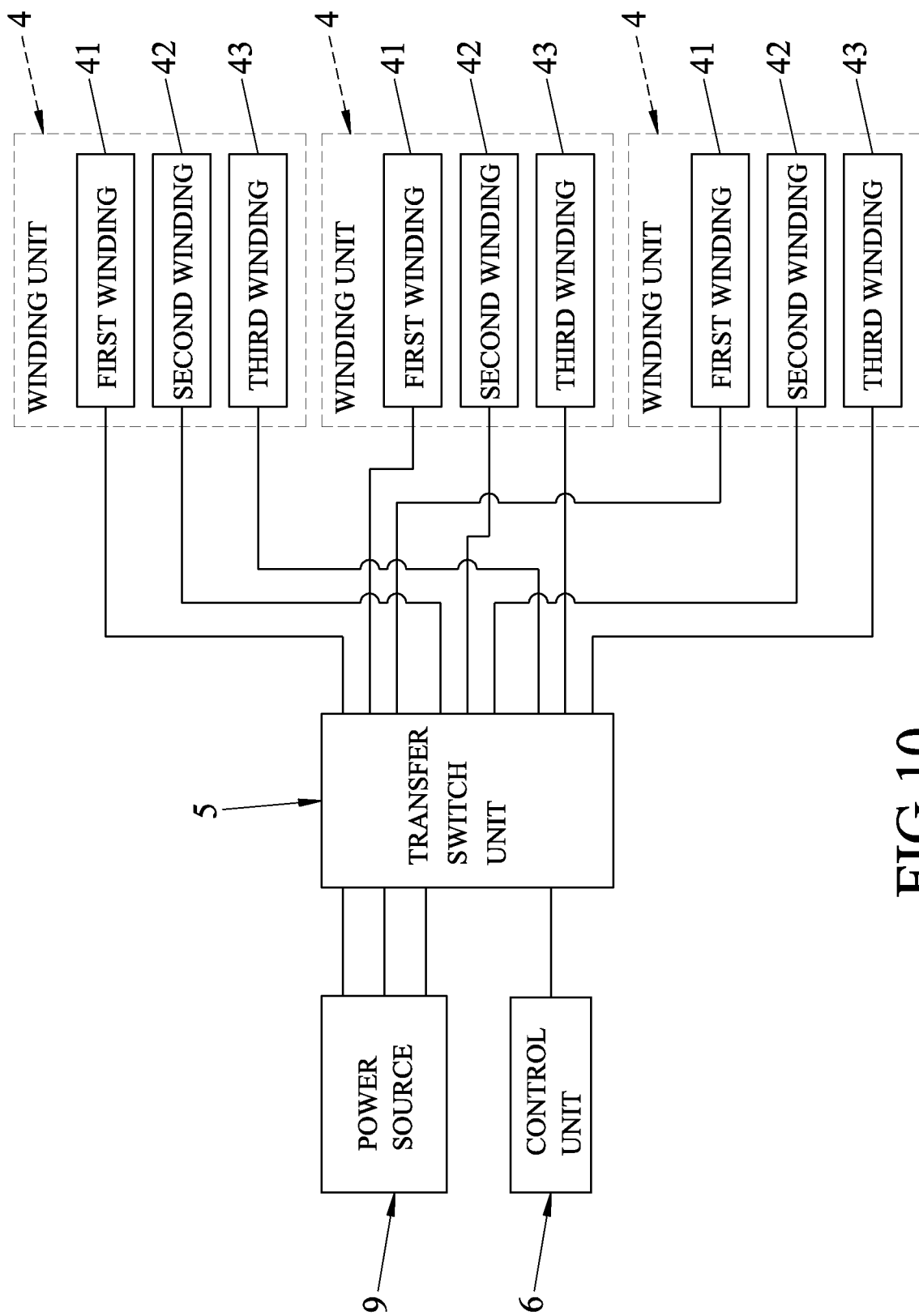
FIG. 10 is a block diagram illustrating a second embodiment of the disclosure.
Figure 11:
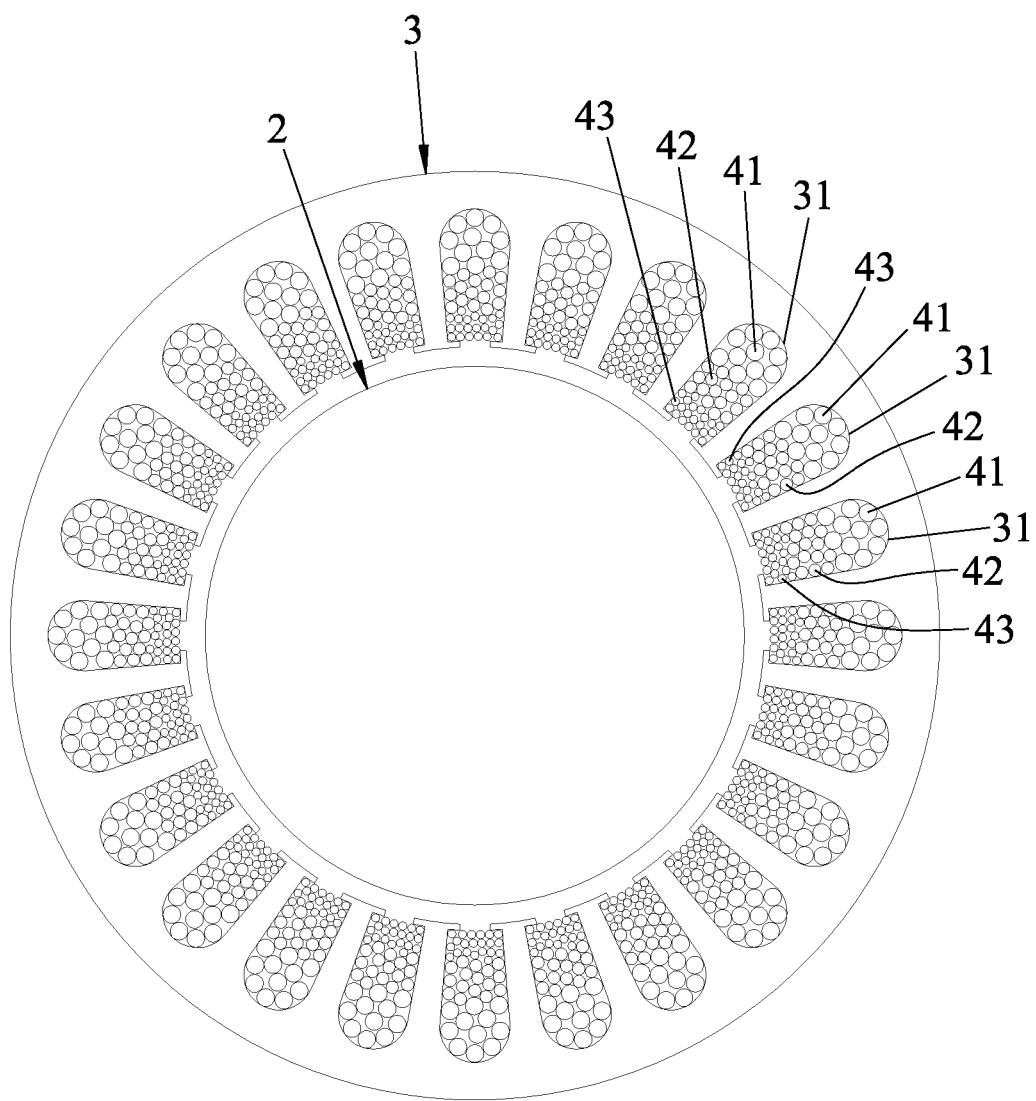
FIG. 11 is a schematic view of the second embodiment, illustrating alignment of first, second and third windings of winding units in the stator unit.

Referring to FIGS. 10 and 11, a second embodiment of the motor device is similar to the first embodiment, with the following differences. Notably, each of the winding units 4 further includes a third winding 43 that is connected to the transfer switch unit 5 and that is installed in the first slots 31 alongside the first and second windings 41, 42. Number of poles of the third winding 43 is greater than that of the second winding 42, output power of the third winding 4 is less than that of the second winding 42, and a wire diameter of the third winding 43 is less than that of the second winding 42. According to Eq. 4, a pole distance of the third winding 43 is smaller than that of the second winding 42.

Similarly, the third winding 43 of each of the winding units 4 has a plurality of interconnected third coils each of which has two third coil sides (portions of each third coil that are installed in the first slots 31 to form two poles). Each of the second coil sides is closer to the rotor unit 2 than each of the first coil sides to the rotor unit 2, and each of the third coil sides is closer to the rotor unit 2 than each of the second coil sides to the rotor unit 2.

In his embodiment, the stator unit has twenty-four first slots 31, and the first, second and third windings 41, 42, 43 of each of the winding units have four poles, eight poles, and twelve poles respectively. As such, referring to Eq. 3 and Eq. 4, each of the first windings 41 has a pole distance of six and a synchronous speed of 1800 rpm, each of the second windings 42 has a pole distance of three and 900 rpm, and each of the third windings 43 has a pole distance of two and 600 rpm.

The output power of the first winding 41, the second winding 42 and the third winding 43 of each of the winding units 4 are respectively two hp, one-half hp and one-fourth hp. The number of turns of the coils of the first, second and third windings 41, 42, 43 can be deducted through Eq. 1, and will not be discussed further in this specification.

The control unit 6 is operable to control the transfer switch unit 5 to select the first winding 41 to be electrically connected to the power source 9 when the motor device is starting up or when a first output magnitude is required, to select the second winding 42 to be electrically connected to the power source 9 when a second output magnitude is required, and to select the third winding 43 to be electrically connected to the power source 9 when a third output magnitude, which delivers lower output power and lower rotational speed in comparison to the second magnitude, is required. Overall, the motor device of this embodiment is operable to be toggled to provide three different output magnitudes instead of two.

Figure 12:
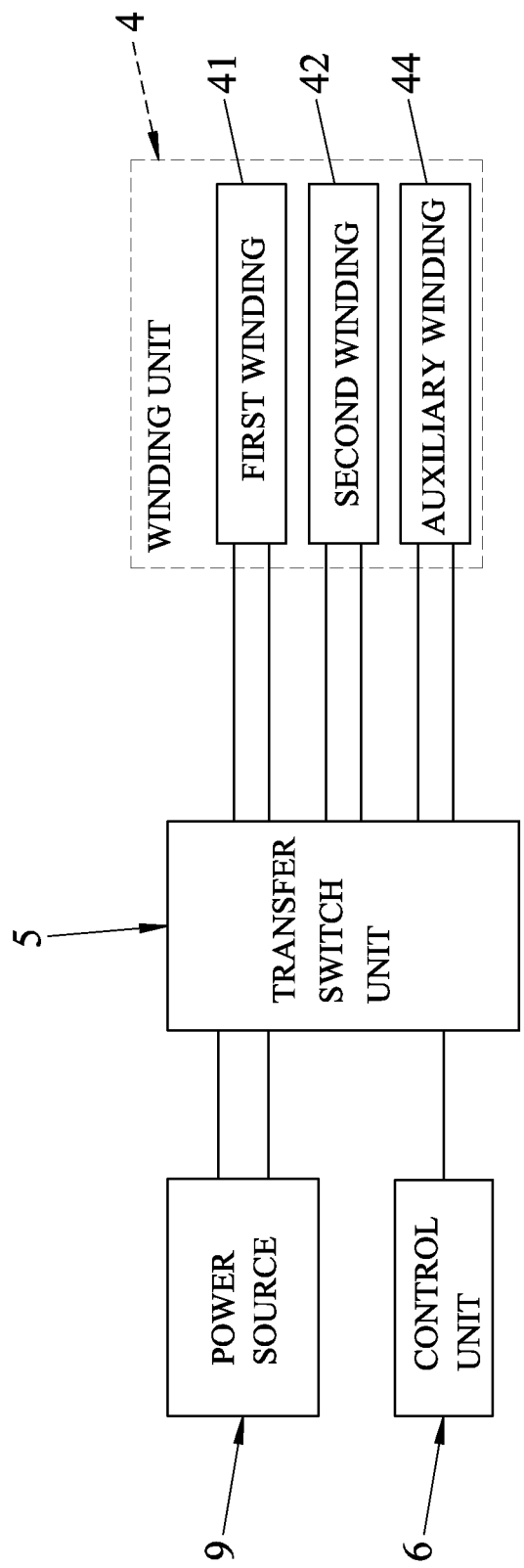
FIG. 12 is a block diagram illustrating a third embodiment of the disclosure.
Figure 13:
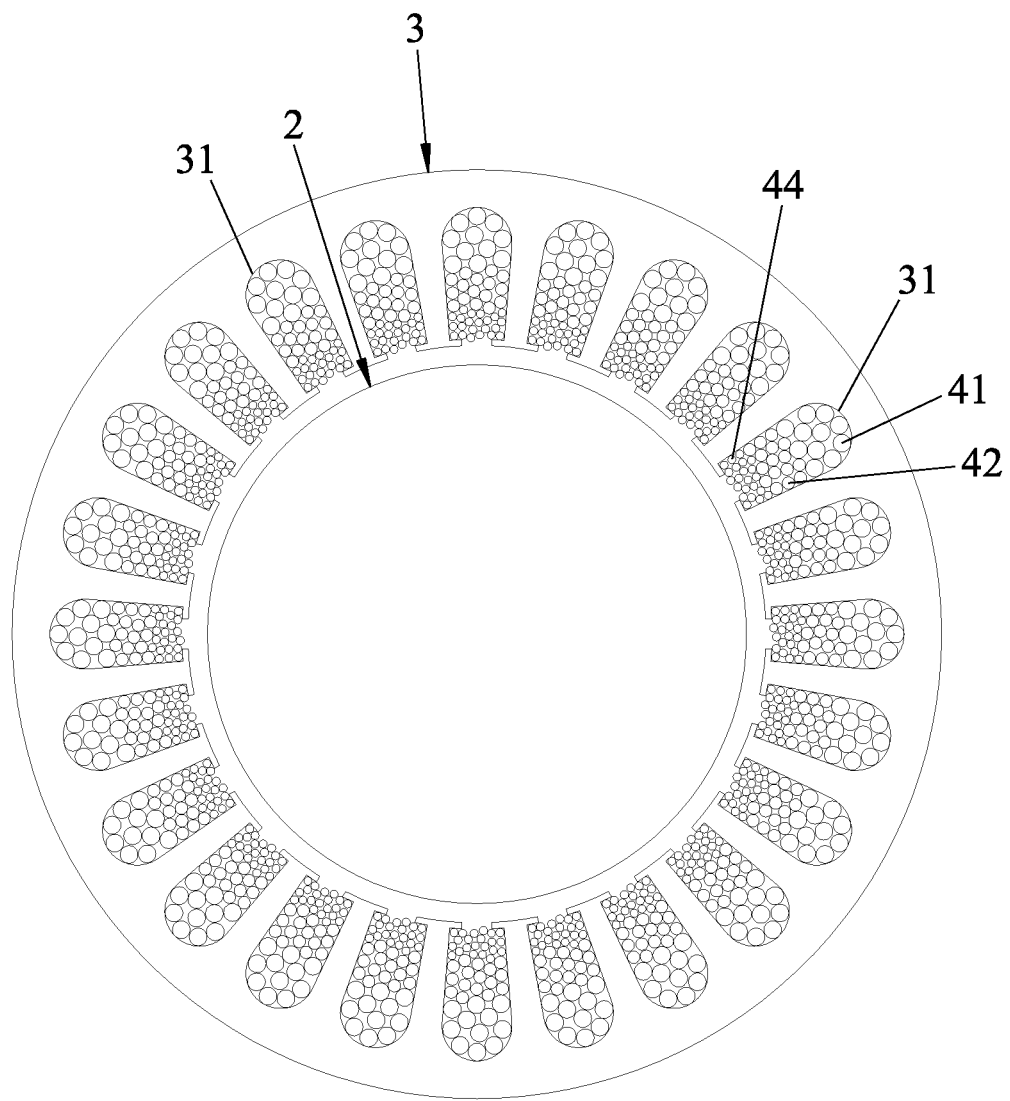
FIG. 13 is a schematic view of the third embodiment, illustrating alignment of first, second and auxiliary windings of a winding unit in the stator unit.

Referring to FIGS. 12 and 13, a third embodiment of the motor device similar to the first embodiment, with the following difference. The motor device is a single-phase motor, and therefore has one winding unit 4. The winding unit 4 includes an auxiliary winding 44 that is installed in the first slots 31 and that is connected to the transfer switch unit 5 and that acts as a start winding, assisting in starting up the motor device, with the first and seconding windings 41, 42 acting as the main windings. In this embodiment, the auxiliary winding 44 is angularly spaced apart from the first winding 41 by ninety degrees for improved start up of the motor device. The use of an auxiliary winding in a single-phase motor is a common knowledge in the field, and will not be discussed in further detail.

During implementation, when the motor device is starting up, the control unit 6 is operable to control the transfer switch unit 5 to select both the first and auxiliary windings 41, 44 to be electrically connected to the power source 9. During the startup, when the motor device has reached around 75% of expected rotational speed, the control unit 6 is operable to control the transfer switch unit 5 to select only the first windings 41 to be electrically connected to the power source 9, supplying the first output magnitude without the auxiliary winding 44. When the motor device has been fully started up, the control unit 6 is operable to control the transfer switch unit 5 to select the second windings 42 to be electrically connected to the power source 9, supplying the second output magnitude with reduced power output and rotational speed. Like the first embodiment, the control unit 6 is operable to toggle the transfer switch unit 5 back and forth, easily switching between the abovementioned output magnitudes to satisfy different loads.

Overall, third embodiment of the motor device provides same benefits as the first embodiment, utilizing single-phase induction motor.

Figure 14:
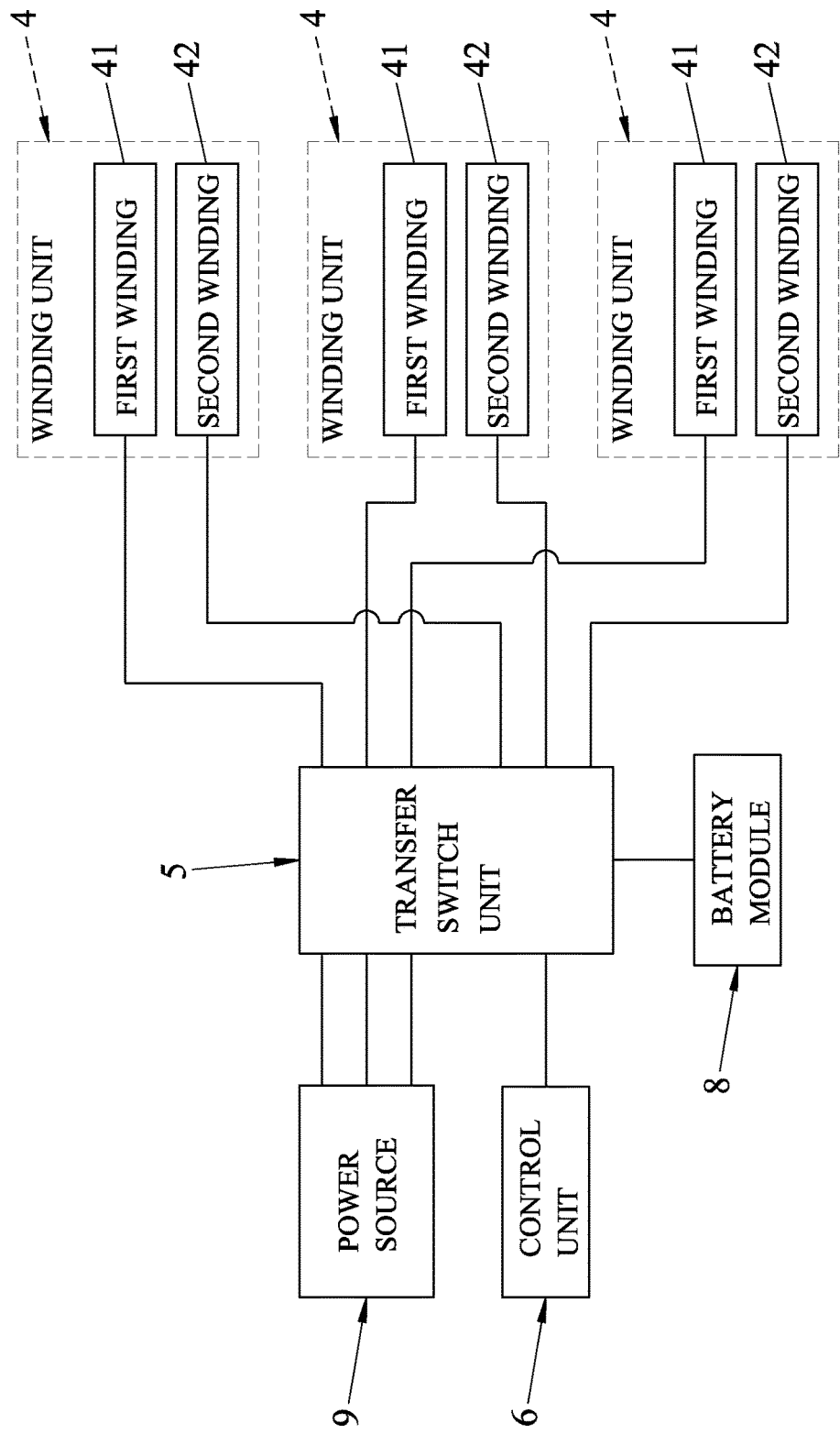
FIG. 14 is a block diagram illustrating a fourth embodiment of the disclosure.
Figure 15:
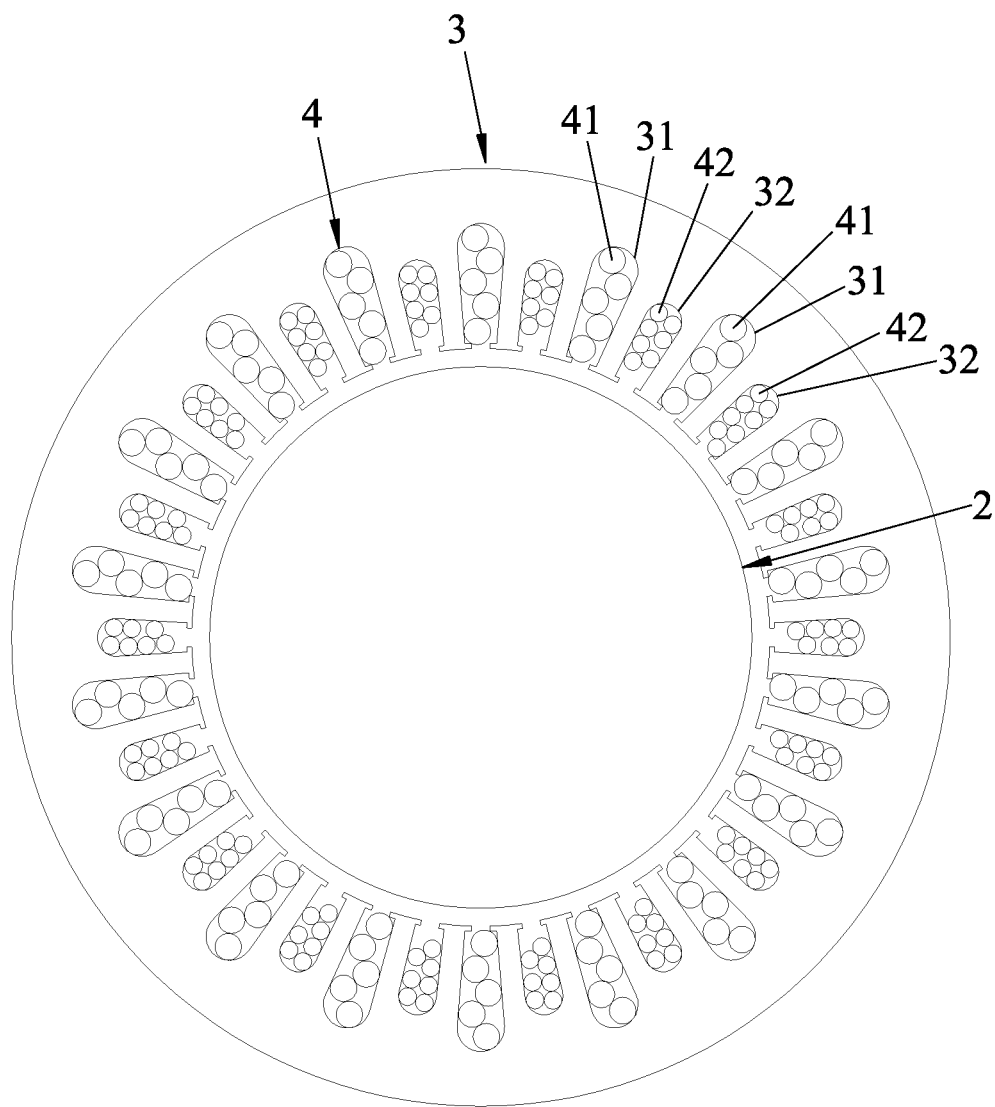
FIG. 15 is a schematic view of the fourth embodiment, illustrating alignment of the first and second windings of the winding units in the stator unit.
Figure 16:
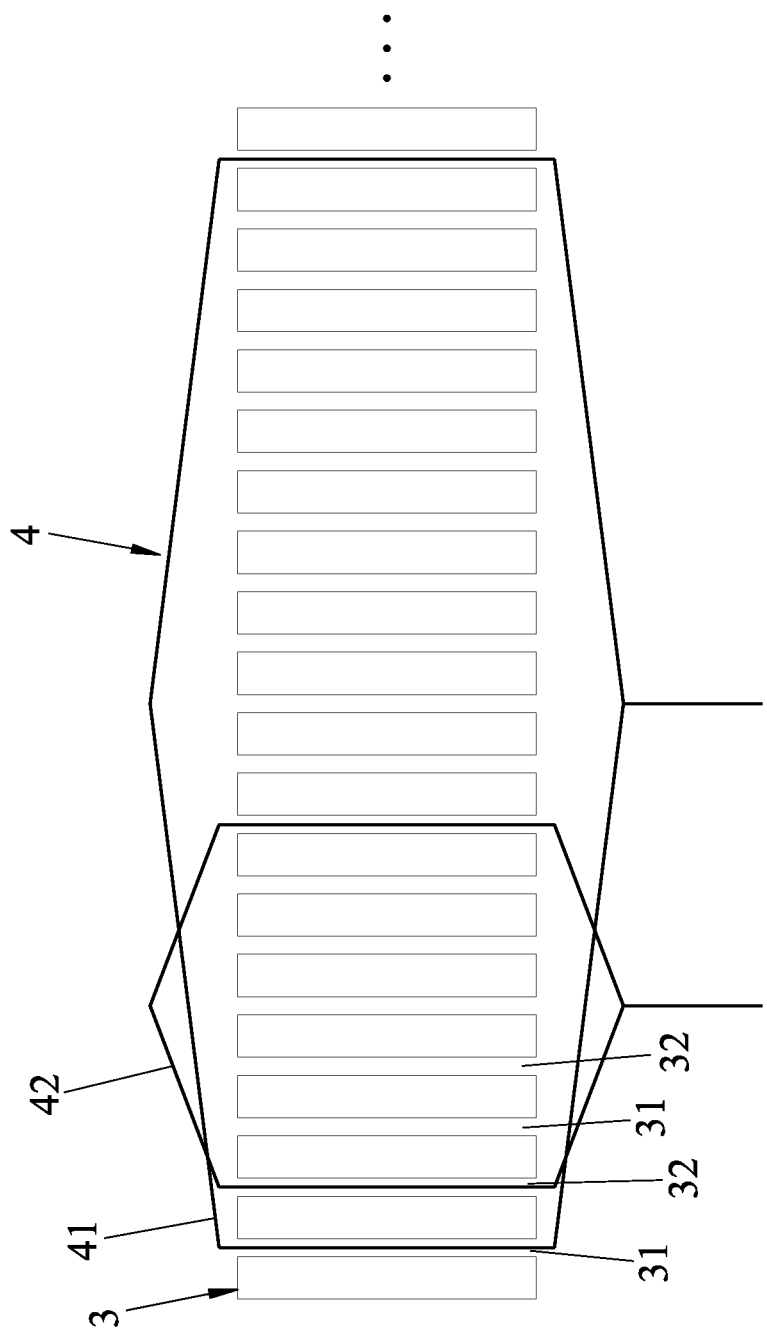
FIG. 16 is a schematic view of the fourth embodiment, illustrating winding patterns of the first and second windings in the stator unit.

Referring to FIGS. 14 to 16, a fourth embodiment of the motor device similar to the first embodiment, with the following difference. The motor device is further adapted to be electrically connected to a battery module 8. The transfer switch unit 5 is controlled by the control unit 6 to allocate access to electricity to each of the first and second windings 41, 42, and to switch the first and second windings 41, 42 between a state of accessing electricity from the power source 9 and a state of supplying electricity to the battery module 8.

The stator unit 3 further includes a plurality of second slots 32. The first slots 31 and the second slots 32 are arranged in an alternating sequence and are angularly spaced apart, and preferably, evenly angularly spaced apart. Depth of the first slots 31 is greater than that of the second slots 32.

In the fourth embodiment, number of the first slots 31 is eighteen, and number of the second slots 32 is eighteen as well. The number of the first and second slots 31,32 can be easily altered in other embodiments.

Similar to the first embodiment, the windings may be evenly distributed among the stator unit 3, and are configured as distributed windings. However, unlike the first embodiment, instead of being installed in the same first slots 31, the first windings 41 and the second windings 42 are respectively installed in the first slots 31 and the second slots 32 in this embodiment. For clarity, only one of the first windings 41 and one of the second windings 42 are shown in FIG. 16 (and in FIGS. 19 and 22, new windings yet to be introduced).

Since the output power of each of the first windings 41 is the rated power of the motor device and is greater than that of each of the second windings 42, number of poles of each of the first windings 41 is less than that of each of the second windings 42, and the wire diameter of each of the first windings 41 is greater than that of each of the second winding 42.

In addition, depth of the first slots 31 is greater than that of the second slots 32. The number of turns of each of the first and second coils of the first and second windings 41, 42 can be deducted through Eq. 1, and will not be discussed further in this specification. In some embodiments, depths of the first slots 31 and the second slots 32 are respectively in proportion to wire diameters of the first windings 41 and the second windings 42 and in proportion to output powers of the first windings 41 and the second windings 42. The magnitude of the output power is related to the number of poles.

Referring back to FIGS. 15 and 16, each of the first windings 41 has two poles, and each of the second windings 42 has six poles. As such, referring to Eq. 3 and Eq. 4, each of the first windings 41 has a pole distance of eighteen and a synchronous speed of 3600 revolutions per minutes (rpm) (assuming the frequency of the power source 9 is 60 Hz), and each of the second windings 42 has a pole distance of six and 1200 rpm. As previously established, since the first slots 31 and the second slots 32 are arranged in an alternating sequence, distance between any one of the first windings 41 to adjacent second windings 42, or vice versa, is always one slot apart.

Like the first embodiment, during implementation, the motor device may deliver one of the first output magnitude and the second output magnitude. In addition, when the motor device happens to generate excess power, the control unit 6 is operable to control the transfer switch unit 5 to select one of the first and second windings 41, 42 to convert the excess power into electricity that can be suppled to the battery module 8 for later use. For example, when the motor device is used in an electric vehicle, the control unit 6 may control the transfer switch unit 5 to select one of the first and second windings 41, 42 for driving the vehicle, and may control the transfer switch unit 5 to select the other one of the first and second windings 41, 42 for storing electricity when the vehicle is braking.

Overall, the fourth embodiment of the motor device has the following additional benefits:

1) In addition to allocating access to electricity to each of the first and second windings 41, 42, when the motor device happens to generate excess power, the transfer switch unit 5 can be further controlled to select one of the first and second windings 41, 42 to convert the excess power into electricity that can be supplied to the battery module 8 for later use. Due to the separation of the first and second windings 41, 42 into the respective first and second slots 31, 32 that are angularly spaced apart in an alternating sequence, the magnetic field formed by each of the first and second windings 41, 42 are less likely to influence each other, improving the overall performance of the motor device. Despite the differences in depths between the first and second slots 31, 32, the motor device in this embodiment can be easily manufactured like that of the previous embodiments by supplying a new, designated mold for the con steel plate of the stator unit 3 during the manufacturing process.

2) The depth of each of the first and second slots 31, 32 is designed to ensure consistent power transfer via the first and second winding 41, 42. The shallower depth of the second slots 32 allows the second windings 42, each of which has smaller wire diameter, to be closer to the rotor unit 2. If the first and second windings 41, 42 were placed in the same slots, there might, be cases in which the distance of the second windings 42 to the rotor unit 2 is different from the distance of the rotor unit 2 to the second windings 42 at the time that the first and second winding 41, 42 are placed in their designated slots, which lead to less desirable performances.

Figure 17:
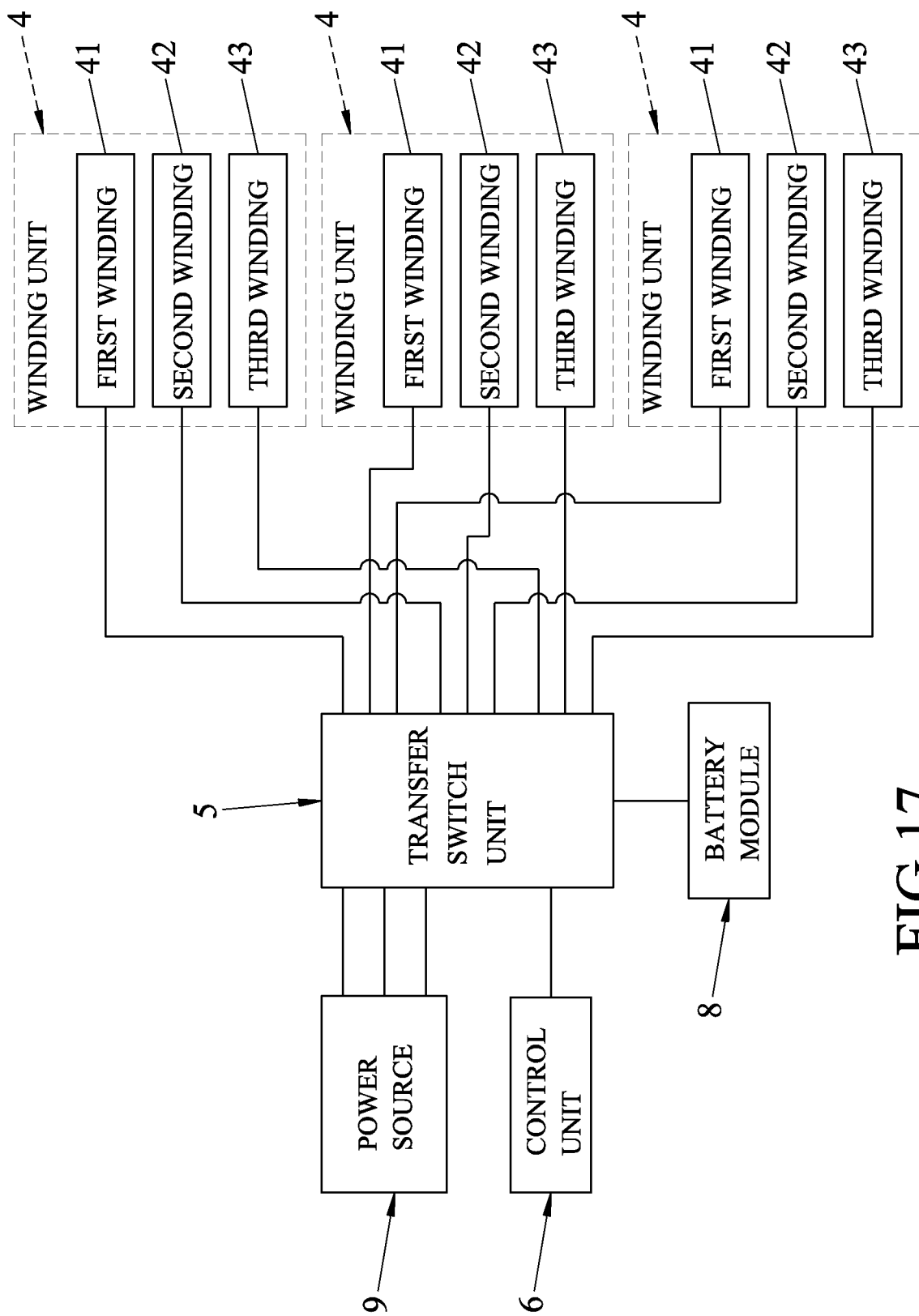
FIG. 17 is a block diagram illustrating a fifth embodiment of the disclosure.
Figure 18:
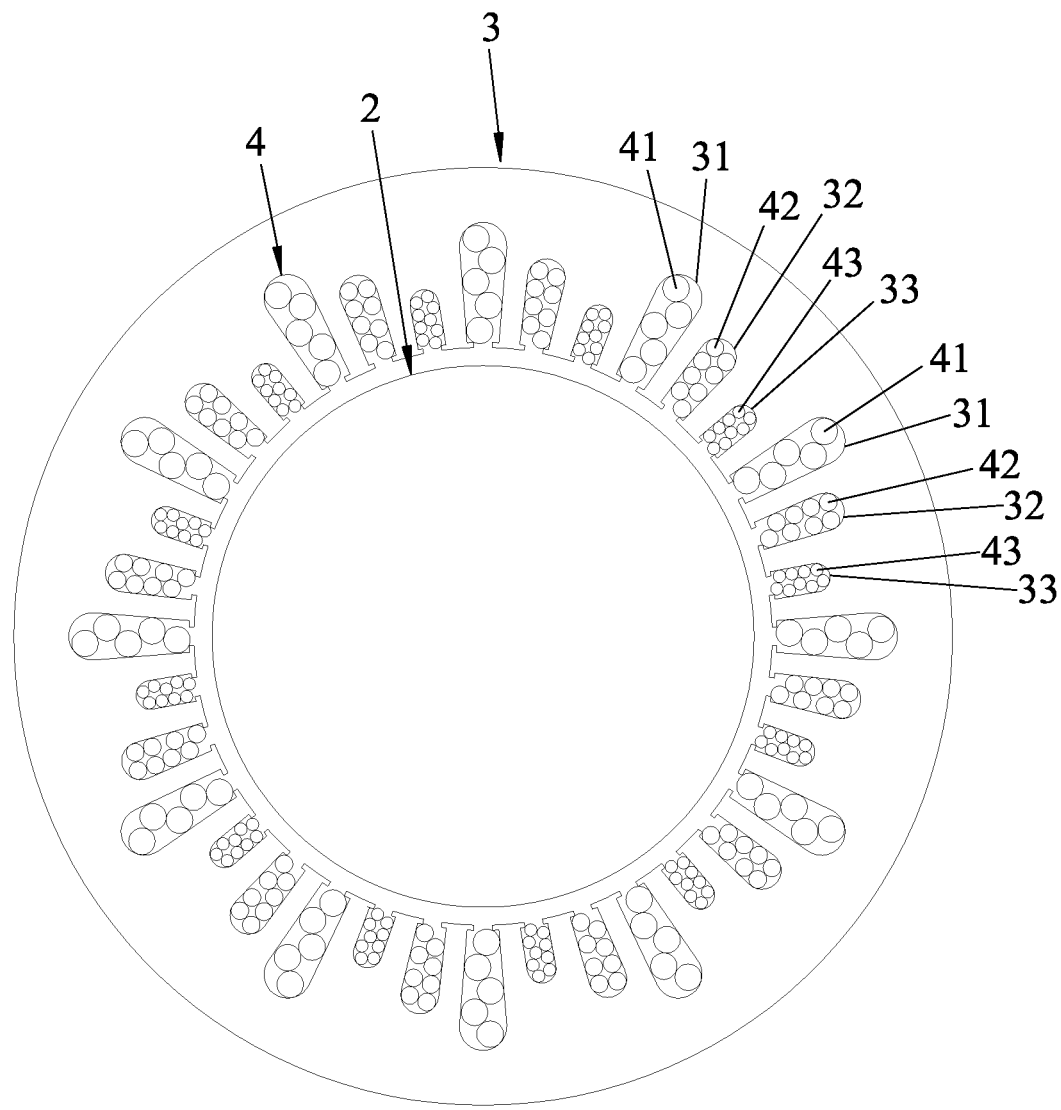
FIG. 18 is a schematic view of the fifth embodiment, illustrating alignment of the first, second, and third windings of the winding units in the stator unit.
Figure 19:
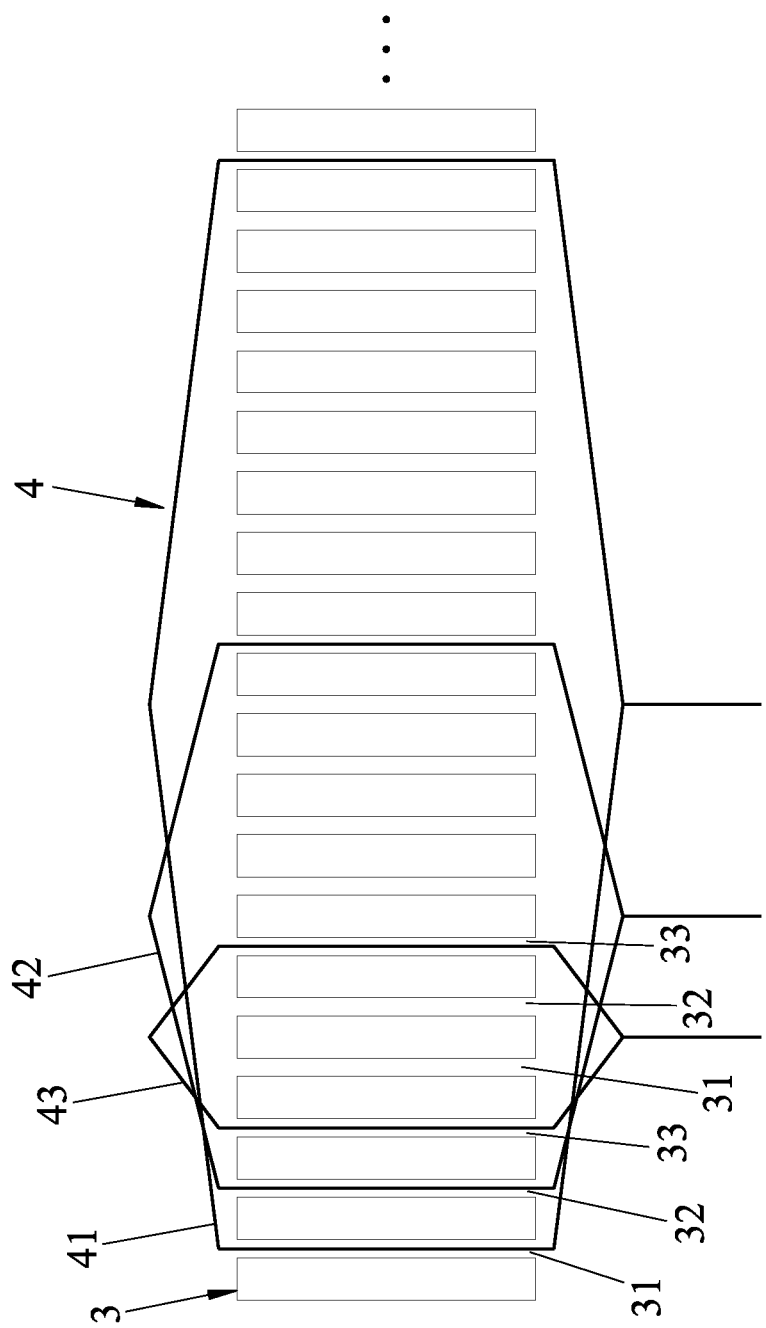
FIG. 19 a schematic view of the first embodiment, illustrating winding pattern of the first, second and third windings in the stator unit.

Referring to FIGS. 17 to 19, a fifth embodiment of the motor device is the combination of the second embodiment with the fourth embodiment. With the inclusion of the third winding 43, the stator unit 3 further includes a plurality of third slots 33, with the third windings 43 being installed therein. The first slots 31 are equi-angularly spaced apart from each other. The second slots 32 are equi-angularly spaced apart from each other. The third slots 33 are equi-angularly spaced apart from each other. The first slots 31, the second slots 32 and the third slots 33 are arranged in such a manner that: there are one first slot 31 and one second slot 32 between two adjacent ones of the third slots 33; there are one third slot 33 and one second slot 32 between two adjacent ones of the first slots 31; and there are one third slot 33 and one first slots 31 between two adjacent ones of the second slots 32. In addition, the depth of the third slots 33 is less than that of the second slots 32, and the third winding 43 is electrically connected to the transfer switch unit 5 to be switched among different states of electricity flow: no net flow, accessing electricity, and supplying electricity. In some embodiments, depths of the first slots 31, the second slots 32 and the third slots 33 are respectively in proportion to wire diameters of the first winding 41, the second winding 42 and the third winding 43, and in proportion to output powers of the first, winding 41, the second winding 42 and the third winding 43. In some embodiments, number of the first slots 31 is twelve, number of the second slots 32 is twelve, and number of the third slots 33 is twelve. Each of the first windings 41 has two poles, each of the second windings 42 has four poles, and each of the third windings 43 has twelve poles. As such, referring to Eq. 3 and Eq. 4, each of the first windings 41 has a pole distance of eighteen and a synchronous speed of 3600 revolutions per minutes (rpm) (assuming the frequency of the power source 9 is 60 Hz), each of the second windings 42 has a pole distance of nine and 1800 rpm, and each of the third windings 43 has a pole distance of three and 600 rpm. Overall, the fifth embodiments combines the benefits from the second and fourth embodiments.

Figure 20:
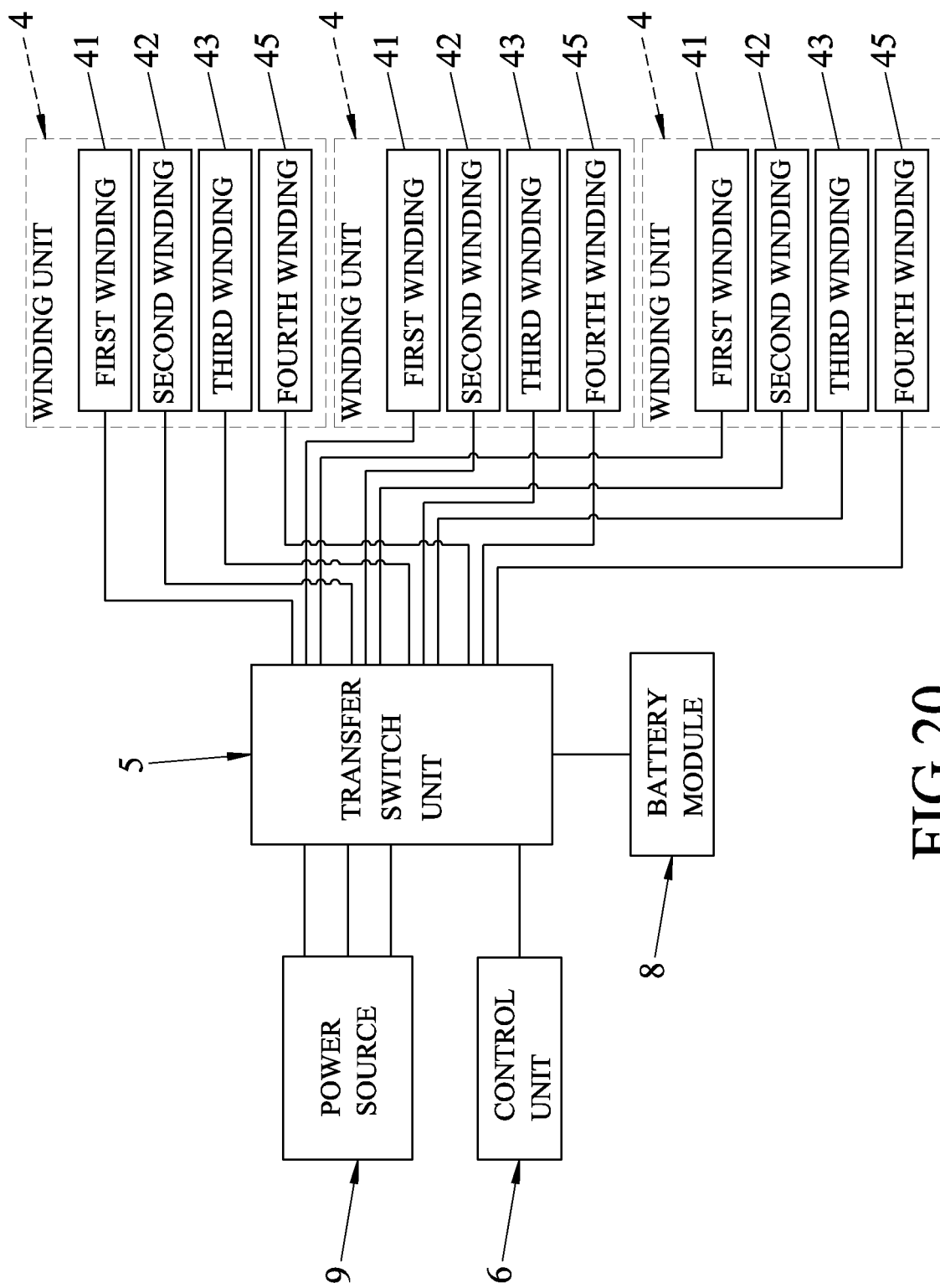
FIG. 20 is a block diagram illustrating a sixth embodiment of the disclosure.
Figure 21:
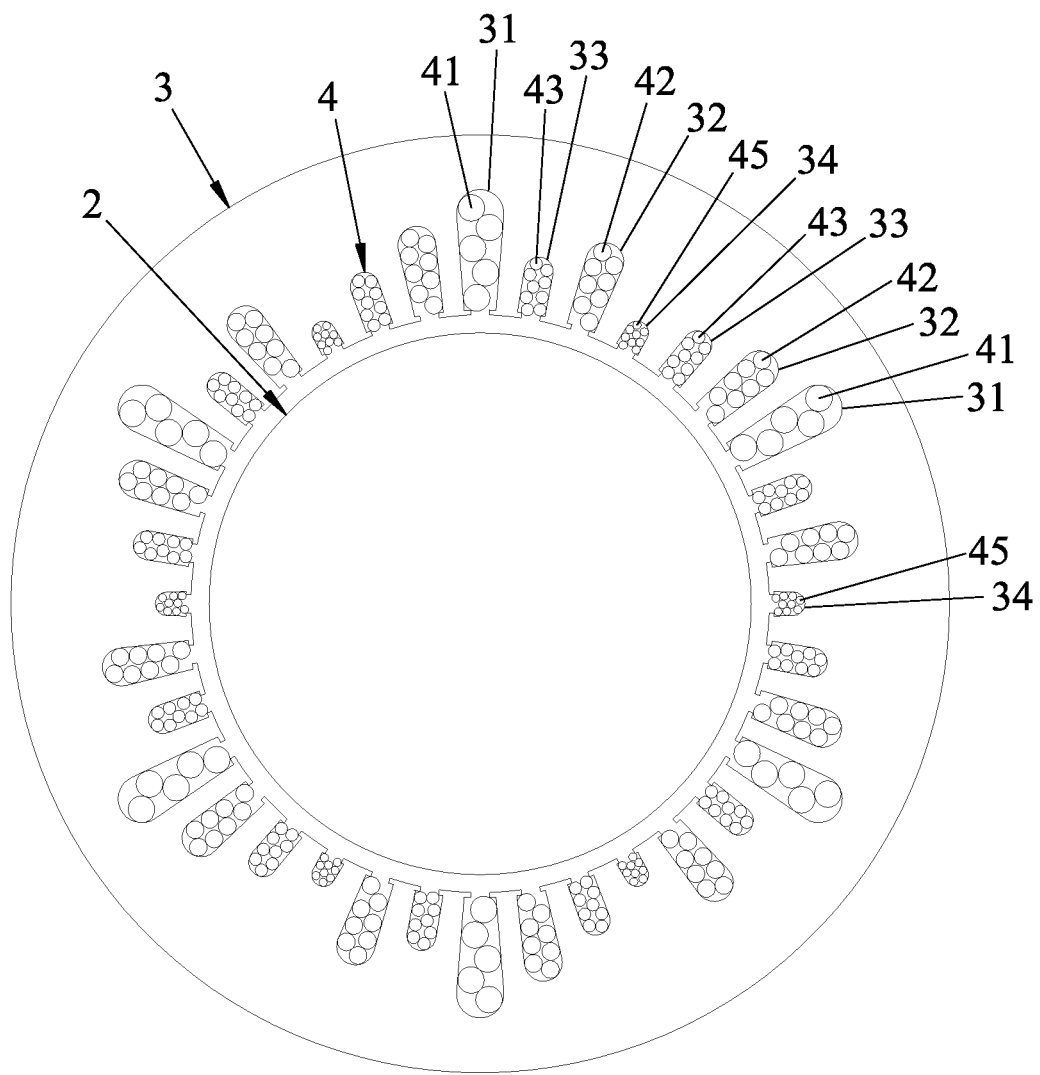
FIG. 21 is a schematic view of the sixth embodiment, illustrating alignment of the first, second, third and fourth windings of the winding units in the stator unit.
Figure 22:
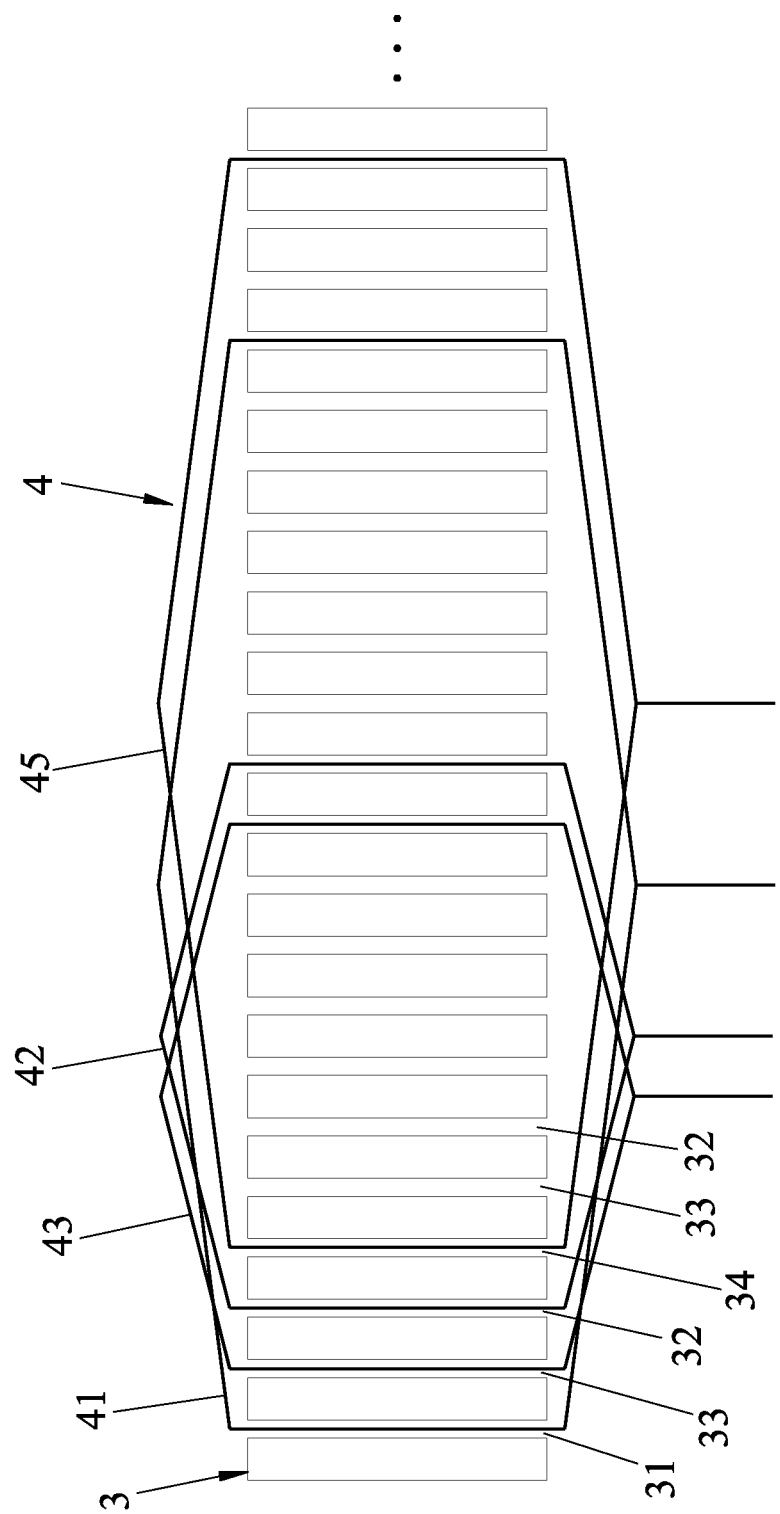
FIG. 22 a schematic view of the sixth embodiment, illustrating winding pattern of the first to fourth windings in the stator unit.

Referring to FIGS. 20 to 22, the sixth embodiment of the motor device is similar to the fifth embodiment, but further including a fourth winding 45 and a plurality of fourth slots 34 for the fourth windings 45 to be installed therein. The first slots 31 are equi-angularly spaced apart from each other. The second slots 32 are equi-angularly spaced apart from each other. The third slots 33 are equi-angularly spaced apart from each other. The fourth slots 34 are equi-angularly spaced apart from each other. In addition, the depth of the fourth slots 31 is less than that of the third slots 33, output power of the fourth winding 45 is less than that of the third winding 43, a wire diameter of the fourth winding 45 is less than that of the third winding 43, and the fourth winding 45 is electrically connected to the transfer switch unit 5 to be switched among different states of electricity flow. In some embodiments, depths of the first slots 31, the second slots 32 the third slots 33 and the fourth slot 34 are respectively in proportion to wire diameters of the first winding 41, the second winding 42, the third winding 43 and the fourth winding 45, and in proportion to output powers of the first winding 41, the second winding 42, the third winding 43 and the fourth winding 45. In some embodiments, number of the first slots 31 is six, number of the second slots 32 is twelve, number of the third slots 33 is twelve, and number of the fourth slots 34 is six. Each of the first windings 41 has two poles, each of the second windings 42 has four poles, each of the third windings 43 has four poles, and each of the fourth windings 45 has two poles. As such, referring to Eq. 3 and Eq. 4, each of the first windings 41 has a pole distance of eighteen and a synchronous speed of 3600 revolutions per minutes (rpm) (assuming the frequency of the power source 9 is 60 Hz), each of the second windings 42 has a pole distance of nine and 1800 rpm, each of the third windings 43 has a pole distance of nine and 1800 rpm, and each of the fourth windings 45 has a pole distance of eighteen and 3600 rpm. In use, the control unit 6 may control the transfer switch unit 5 to select one of the first, second, third and fourth windings 41, 42, 43, 45 of each of the winding units 4 to output power. Moreover, the control unit 6 may control the transfer switch unit 5 to select two of the first, second, third and fourth windings 41, 42, 43, 45 that have the same synchronous speed (i.e., first and fourth windings 41, 45 or second and third windings 42, 43) to simultaneously output power, thereby providing various operations for different demends.

In other embodiments, the type of windings with distinct features (wire diameter, number of poles) can be further expanded, such that it is possible to incorporate more than three types of windings and more than three types of slots in the stator unit 3 for respective types of windings.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A motor device comprising:
   a stator unit;
   a rotor unit being rotatable relative to said stator unit;
   at least one winding unit including first and second windings that are installed in said stator unit, number of poles of said first winding being less than that of said second winding; and
   a transfer switch unit electrically connected to said first and second windings, and being controlled to allocate access to electricity to each of said first and second windings;
   wherein said stator unit includes a plurality of first slots and second slots, said first windings being installed in said first slots and said second windings being installed in said second slots; and
   wherein depth of said first slots is greater than that of said second slots.

2. The motor device as claimed in claim 1, wherein said transfer switch unit is controlled to switch each of said first and second windings between a state of accessing electricity and a state of supplying electricity.

3. The motor device as claimed in claim 1, wherein output power of said first winding is greater than that of said second winding.

4. The motor device as claimed in claim 3, wherein said transfer switch unit is controlled to select said first winding to access electricity when said motor device is starting up or when a first output magnitude is required, and to select said second winding to access electricity when said motor device has started up or when a second output magnitude is required.

5. The motor device as claimed in claim 3, wherein a wire diameter of said first winding is greater than that of said second winding.

6. The motor device as claimed in claim 3, wherein said first winding has a plurality of first coil sides, and said second winding has a plurality of second coil sides, each of said second coil sides of said second winding being closer to said rotor unit than each of said first coil sides of said first winding to said rotor unit.

7. The motor device as claimed in claim 3, wherein the output power of said first winding is a rated power of said motor device.

8. A motor device comprising:
   a stator unit;
   a rotor unit being rotatable relative to said stator unit;
   at least one winding unit including first and second windings that are installed in said stator unit, number of poles of said first winding being less than that of said second winding; and
   a transfer switch unit electrically connected to said first and second windings, and being controlled to allocate access to electricity to each of said first and second windings;

wherein said stator unit includes a plurality of first slots and second slots, said first windings being installed in said first slots and said second windings being installed in said second slots; and wherein said first slots are equi-angularly spaced apart from each other, said second slots being equi-angularly spaced apart from each other, said first slots and said second slots being arranged in an alternating sequence.

9. A motor device comprising:

a stator unit;

a rotor unit being rotatable relative to said stator unit;

at least one winding unit including first and second windings that are installed in said stator unit, number of poles of said first winding being less than that of said second winding; and a transfer switch unit electrically connected to said first and second windings, and being controlled to allocate access to electricity to each of said first and second windings;

wherein said at least one winding unit further includes a third winding that is installed in said stator unit, and number of poles of said third winding is greater than that of said second winding;

wherein said transfer switch unit is further electrically connected to said third winding, and is controlled to allocate access to electricity to said third winding;

wherein said stator unit includes a plurality of first slots, a plurality of second slots and a plurality of third slots, said first windings being installed in said first slots, said second windings being installed in said second slots, and said third windings being installed in said third slots; and wherein depths of said first slots, said second slots and said third slots are respectively in proportion to wire diameters of said first winding, said second winding and said third winding.

10. The motor device as claimed in claim 9, wherein transfer switch unit is controlled to switch said third winding between a state of accessing electricity and a state of supplying electricity.

11. The motor device as claimed in claim 9, wherein output power of said first winding is greater than that of said second winding, and output power of said second winding being greater than that of said third winding.

12. The motor device as claimed in claim 11, wherein a wire diameter of said first winding is greater than that of said second winding, and a wire diameter of said second winding is greater than that of said third winding.

13. The motor device as claimed in claim 11, wherein said first winding has a plurality of first coil sides, said second winding has a plurality of second coil sides, and said third winding has a plurality of third coil sides, each of said second coil sides being closer to said rotor unit than each of said first coil sides to said rotor unit, each of said third coil sides being closer to said rotor unit than each of said second coil sides to said rotor unit.

14. A motor device comprising:

a stator unit;

a rotor unit being rotatable relative to said stator unit;

at least one winding unit including first and second windings that are installed in said stator unit, number of poles of said first winding being less than that of said second winding; and a transfer switch unit electrically connected to said first and second windings, and being controlled to allocate access to electricity to each of said first and second windings;

wherein said at least one winding unit further includes a third winding that is installed in said stator unit, and number of poles of said third winding is greater than that of said second winding;

wherein said transfer switch unit is further electrically connected to said third winding, and is controlled to allocate access to electricity to said third winding;

wherein said stator unit includes a plurality of first slots, a plurality of second slots and a plurality of third slots, said first windings being installed in said first slots, said second windings being installed in said second slots, and said third windings being installed in said third slots; and wherein said first slots are equi-angularly spaced apart from each other, said second slots being equi-angularly spaced apart from each other, said third slots being equi-angularly spaced apart from each other, said first slots, said second slots and said third slots being arranged such that:

there are one first slot and one second slot between two adjacent ones of the third slots;

there are one third slot and one second slot between two adjacent ones of the first slots; and there are one third slot and one first slot between two adjacent ones of the second slots.

* * * * *